United States Patent [19]
Heinrich et al.

[11] Patent Number: 5,792,013
[45] Date of Patent: Aug. 11, 1998

[54] PLATE LINK CHAIN FOR A CONTINUOUSLY VARIABLE, MOVABLE CONE-TYPE TRANSMISSION

[75] Inventors: Johannes Heinrich, Friedrichsdorf/Taunus; Manfred Maier, Rossdorf; Klaus Söhnge, Usingen; Dirk Weitzel, Hammersbach; Georg Kell, Frankfurt am Main; Gert Schönnenbeck, Bad Homburg v.d.H.; Peter Wagner, Biebertal, all of Germany

[73] Assignees: CVT Verwaltungs GmbH & Co.; Patentverwertungs KG, both of Bad Homburg, Germany

[21] Appl. No.: 820,161

[22] Filed: Mar. 19, 1997

[30] Foreign Application Priority Data

Apr. 3, 1996 [DE] Germany ............ 196 13 368.8

[51] Int. Cl.$^6$ ...................................... F16H 55/56
[52] U.S. Cl. .......................... 474/8; 474/242; 474/245
[58] Field of Search ........................ 474/8, 18, 242, 474/245, 214, 215, 216, 217

[56] References Cited

U.S. PATENT DOCUMENTS

| | | | |
|---|---|---|---|
| 3,016,755 | 1/1962 | Dittrich ............................. | 474/8 |
| 3,089,346 | 5/1963 | Dittrich et al. ..................... | 474/242 |
| 3,353,421 | 11/1967 | Ketterle et al. .................... | 474/215 |
| 3,916,709 | 11/1975 | Steuer et al. ...................... | 474/242 |
| 4,581,001 | 4/1986 | Rattunde et al. ................... | 474/214 |
| 4,608,036 | 8/1986 | Dono ............................... | 474/245 X |
| 4,631,042 | 12/1986 | Rattunde .......................... | 474/8 |
| 4,795,406 | 1/1989 | Dittrich et al. ..................... | 474/8 |
| 4,944,715 | 7/1990 | Ueda et al. ........................ | 474/245 |

FOREIGN PATENT DOCUMENTS 1 065 685  3/1960  Germany.

*Primary Examiner*—Thomas R. Hannon
*Attorney, Agent, or Firm*—Frishauf, Holtz, Goodman, Langer & Chick, P.C.

[57] ABSTRACT

Rocker link elements (32, 33), which are located in pairs for connection of plate links (40), have end facing friction surfaces (43) which are essentially part spherical, for cooperation with essentially part spherical cone surfaces of cone disks (3, 4, 7, 8, 24–27). A base or central surface line is located approximately at a radial position of engagement with the end facing surfaces (43) of the rocker elements (32, 33) with the cone surfaces of the cones when the transmission is set for a transmission ratio of 1:1. To prevent engagement of edge regions of the rocker link elements with the respective cone disks, surface lines (54, 55) located radially outwardly, or inwardly, respectively, from a central surface line (49, 53), are inclined by an angle (δ), with respect to the base or central surface line. The angle of inclination (δ) increases, in positive or negative direction, respectively, starting at said central or base surface line about the intersection with the rocking surfaces (41, 42) in the direction to the cone surface (44) of the respective cone in engagement with the respective rocker link element. The engagement surfaces between the rocker link elements and the cone surfaces will thereby be protected by material of the rocker link elements adjacent the engagement location.

6 Claims, 5 Drawing Sheets

PLATE LINK CHAIN FOR A CONTINUOUSLY VARIABLE, MOVABLE CONE-TYPE TRANSMISSION

Reference to related patents, the disclosures of which are hereby incorporated by reference:

U.S. Pat. No. 3,089,346, Dittrich et al.;
U.S. Pat. No. 3,353,421, Ketterle et al.;
U.S. Pat. No. 3,916,709, Steuer et al.;
U.S. Pat. No. 4,581,001, Rattunde et al.;
U.S. Pat. No. 4,631,042, Rattunde.

Reference to related patent disclosure:
German Patent 1 065 685, Besel.

FIELD OF THE INVENTION

The present invention relates to a plate link chain for a continuously variable, movable cone-type transmission, in which rocker link elements have end facing surfaces which can engage between the cones of the cone-type transmission, and which are designed to reduce wear on at least one of the rocker elements and the cones when the transmission is in use.

BACKGROUND

Movable cone-type transmissions usually have pairs of cone disks. The cone disks have surfaces which are not truly mathematical cones but, rather, are curved or bulged, e.g. at least generally spherical. Some such transmissions use pairs of disks located on respective input shafts and output shafts, which form an asymmetrical disk cone, in that one of these disks practically extends in radial direction.

Numerous types of link chains for variable ratio transmissions are known, and reference is made to German Patent 10 65 656, Dittrich et al.; U.S. Pat. No. 3,089,346, Dittrich et al.; U.S. Pat. No. 3,353,421, Ketterle et al.; U.S. Pat. No. 3,916,709, Steuer et al.; U.S. Pat. No. 4,581,001, Rattunde et al. and U.S. Pat. No. 4,631,042, Rattunde. These chains may be formed in two- or double-link connections, or in triple-link connections, see, for example, U.S. Pat. No. 4,581,001, Rattunde et al.

The end faces of the rocker link elements which engage the cone disks, usually with curved, e.g. spherical surfaces, also are curved, that is, at least quasi-spherical. These surfaces on the disks, as well as on the rocker elements, are in frictional engagement. The curved form of the disks is used, particularly in order to prevent inclined running of the link chain, that is, to overcome the effects of tracking error or alignment error upon change of the transmission ratio from a 1:1 relationship between input and output shafts. These tracking errors arise due to the geometric characteristics of cone disks upon engagement with surfaces having other surface configurations on the frictional engagement regions, upon change in the transmission ratio. The end surfaces of the rocker elements which are intended for cooperation with curved, or spherical, or quasi-spherical cone disks, usually have somewhat circularly shaped surface lines, looked at radially with respect to the running direction of the chain. The end surfaces, formed of a composite of such surface lines, then extend perpendicularly with respect to the longitudinal extent of the chain or, respectively, the rocker axis of these rocker elements which, in turn, are parallel to the operating axes.

It has been found that these essentially circularly curved friction surfaces of the cone disks and, likewise, essentially circularly curved end surfaces of the rocker elements, have different force transfer characteristics as the transmission ratio of the transmission changes. Particularly, when either one of the two extreme transmission ratios are selected, it may happen that the rocker link elements transfer forces at their edges only; the facing surfaces of the rocker elements then, looked at in running direction of the chain, are only in contact with the friction surface of the associated cone disk in the region of the respective end limit of the engaging surface of the link elements. As a result, a very high specific pressure will occur at the contact points between the cone disks and the rocker link elements. In high performance transmissions, locally excessive wear will result at the facing surfaces of the rocker link elements. Pitting at the surfaces of the rocker link elements may occur and, also, the cone disks may have a tendency to form grooves, or gray stippiness formation. An increase in the engagement surfaces may also result and, with it, the danger of hydrodynamic slippage, with the well-known negative results. U.S. Pat. No. 4,631,042, Rattunde, is here referred to.

THE INVENTION

It is an object to provide a link chain for a cone-type transmission in which the friction surfaces of the rocker link elements are so shaped that edge transfer of forces from the rocker link elements is effectively eliminated; or, in general, to improve the stability of frictional engagement of a variable ratio transmission over the entire range of transmission variation possible, and thereby obtain improved power and energy transfer by improved engagement conditions between the chain and the cone elements.

Briefly, the end facing surfaces are slightly distorted from the theoretical, effectively circular shape. The end facing surfaces define a base or central surface line, parallel to the direction of the chain when located in the transmission. This base or central surface line is located approximately at the radial position of engagement of the end facing surfaces of the rocker elements with the cone surface of the transmission, when the transmission is set for a transmission ratio of 1:1 between an input and an output shaft. In accordance with the invention, the surface lines radially outwardly from the base or central surface line, and which describe the curved facing surfaces of the rocker elements, are inclined by an angle of inclination $\delta$, which increases from 0 starting at the base or central surface line, about their intersection with the rocking surface of the rocker elements in the direction of the cone surface of the cone of engagement with the rocker link elements.

By this inclination, the contact point of the respective rocker element end surface is moved away from its common edge with the adjacent rocker surface in the direction of the oppositely lying edge—with respect to the running direction—of the rocker facing surface. This change is suitable for the radially outer region of the facing surfaces of the rocker elements, which is effective at small operating radii between the cone disks. The outer region is comparatively the most highly loaded region. As a consequence of this shift of the rocker element engagement surface, the contact position is placed further in the region between the edge surfaces and is thus surrounded at all sides from material of the rocker element itself, which material is not directly subject to pressure engagement by the friction surface of the associated cone disk. Consequently, the highly stressed contact position is supported all around by material of the rocker link element, to permit uniform deformation of that contact point over its entire cross-sectional area. Excessive wear, previously occurring due to the decreased contact point (decreased because of geometric reasons) is thus prevented.

3

The rocker link elements can easily be made, in accordance with a feature of the invention, by merely re-shaping the engagement surfaces. Hardly any additional manufacturing costs arise; the lifetime of the resulting chain is substantially increased, while permitting substantially higher transfer of torque and power.

The angle δ of inclination preferably changes smoothly from zero at the base or central surface line, radially outwardly, up to about 2°. This is a small deviation from a circular surface of the engagement surface previously used, and has been found to be sufficient in order to achieve the improvement in operation and lifetime.

A similar change in the surface lines radially inwardly from the central surface line achieves the same results with respect to large radii of operation between the cone disk pairs. Thus, substantial improvement is obtained also at the radially outwardly located portions of the cone disks for those rocker link elements which engage these radially outwardly located portions.

Preferably, the rocker link elements change in a positive angle δ for the radially outwardly central surface lines, and in a negative angle—δ for the radially inwardly located surface lines. Rocker elements, thus, having inclined portions varying about the angle zero provide the improvement of longer lifetime and higher torque and power transfer over its entire range of transmission, by providing optimum engagement pressures throughout.

The discussion with respect to inwardly and outwardly located surface lines is equally applicable to both, considering, of course, that for the wider or larger operating radii, the associated facing surface engagements then arising, place the contact points with the cone disks closer to the edge of the rocker link elements, which are opposite the common edge between the facing surface and the rocking surface.

DRAWINGS

Figure 5:
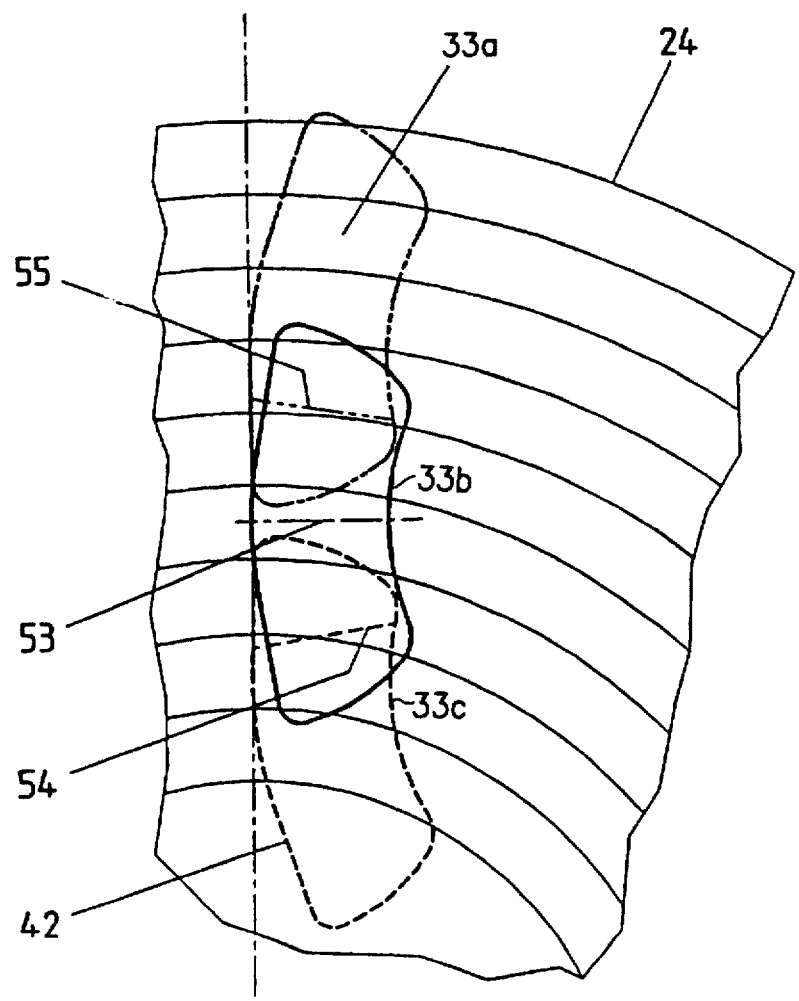
FIG. 5 is a schematic view of FIG. 4, looked at from the left side, and illustrating sequential rocker link elements in different rocking positions.
Figure 6A:
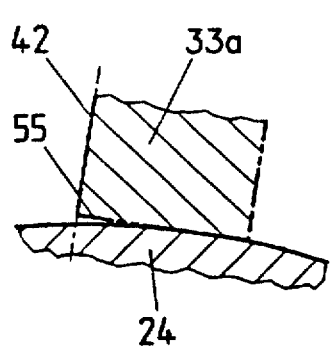
Figure 6B:
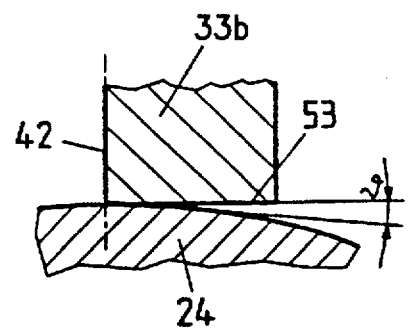
Figure 6C:
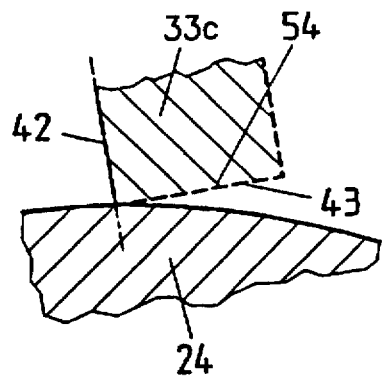
Figure 7:
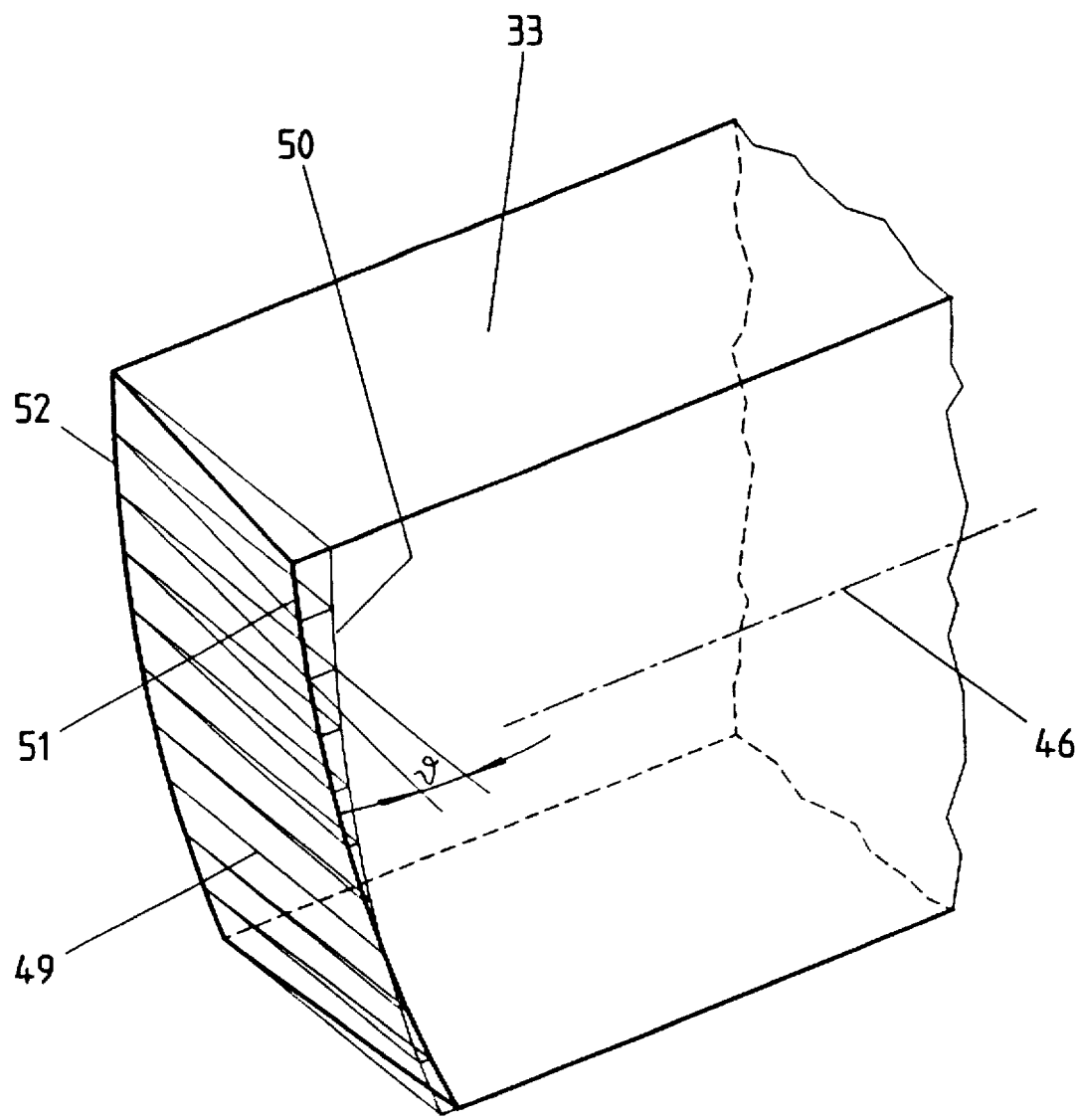

FIG. 6, collectively, are partial, part-sectional radial views, illustrating the rocker link elements of FIG. 5 in respectively different positions, in which FIG. 6a corresponds to the rocker link element position of rockerink 33a shown in chain-dotted representation in FIG. 5, FIG. 6b to the rocker link element 33b shown in full-line position FIG. 5, and FIG. 6c to the rocker link element 33c shown in broken-line position in FIG. 5; and FIG. 7 is a perspective schematic and enlarged view of an end portion of a rocker link element, in which the end surface is modified in accordance with the present invention.

4

DETAILED DESCRIPTION

Figure 1:
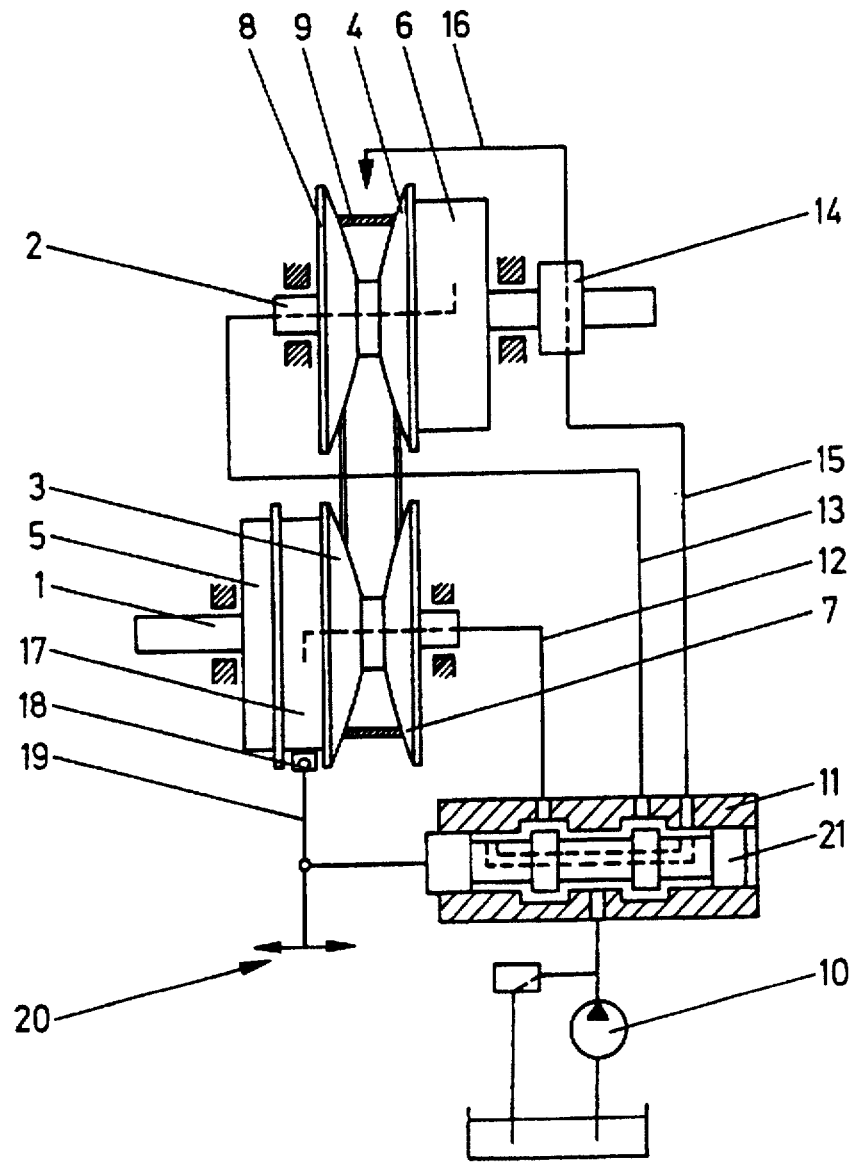
FIG. 1 is a highly schematic and abbreviated diagram of a hydraulically controlled continuously variable transmission for which the link chain of the present invention is particularly applicable.

To appreciate the present invention, a conventional variable cone-type transmission and its operation will be described insofar as necessary for an understanding of the invention. Referring first to FIG. 1, which shows a well-known hydraulically controlled variable ratio transmission, hydraulically adjustable cone disks are coupled to a drive shaft 1 and a driven shaft 2. The cone disks 3, 4, together with cylinder-piston units 5, 6, are coupled to fixedly rotatably supported cone disks 7, 8. A plate link chain 9 having steel plate links rotates between the cone disks of the cone disk pairs 3, 7; 4, 8.

The cylinder-piston units 5,6 receive pressure fluid from the pressure fluid source 10, over a four-control edge spool valve 11 and hydraulic lines 12, 13. The driven shaft 2 is coupled to a torque sensor 14, which receives hydraulic fluid from line 15 of fluid flowing out of the control valve 11. This fluid is throttled in accordance with torque being transmitted. Excess fluid is applied over a line 16, without pressure, and used for lubrication of the chain 9. The throttled fluid also controls the pressure on the drive cylinder-piston unit 5. Cylinder 5 is formed with a circumferential groove 17. A slider 18 slides in the groove 17, and is coupled to a lever 19 of a transmission control element or handle 20. The lever 19 is also linked to control the spool 21 of the four-edge spool valve 11.

The operation and function of this transmission need not be explained in detail here, since it well known; reference is made to the referenced patents at the heading of this application, all of which are incorporated herein by reference.

Figure 2:
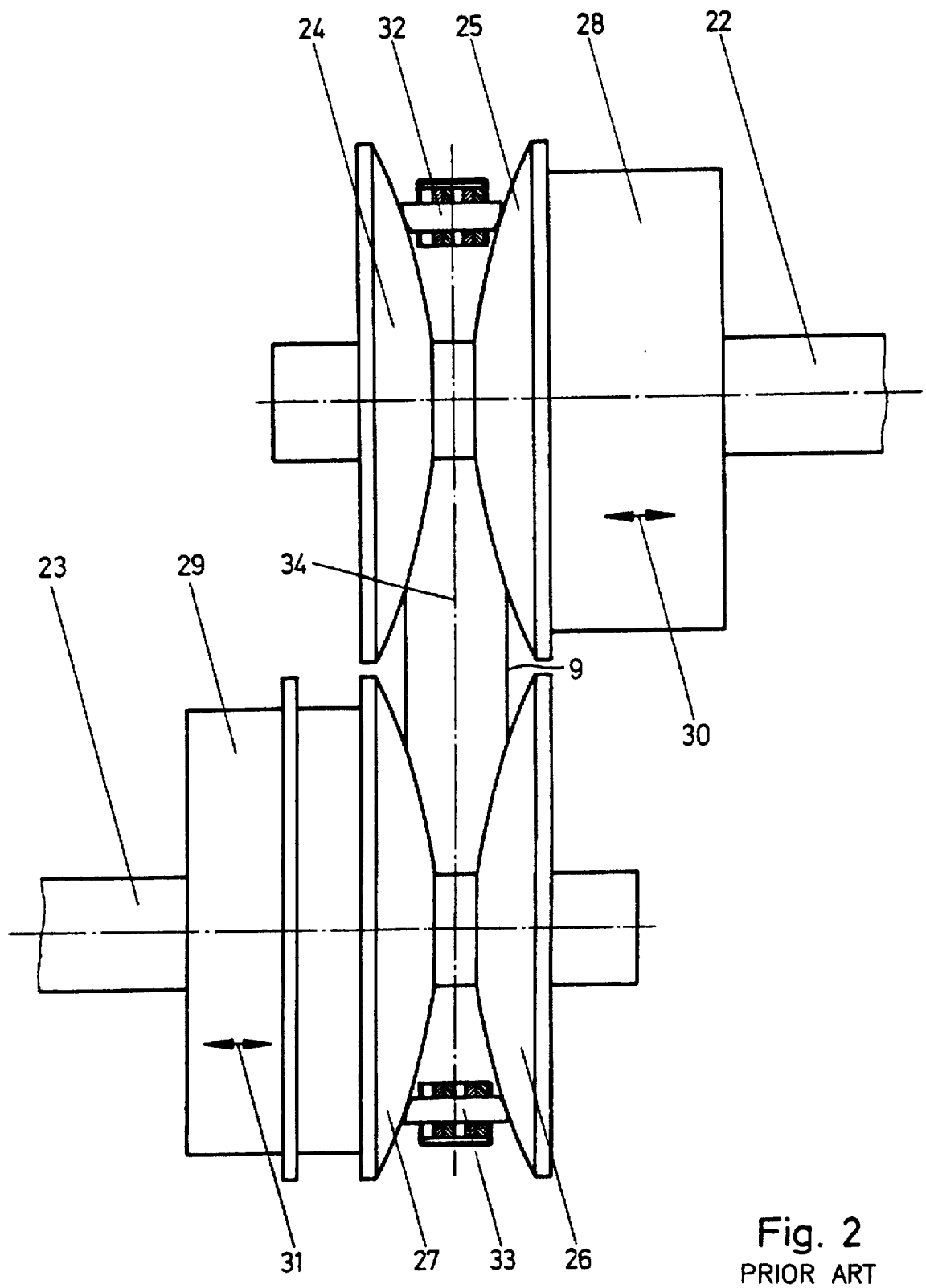
FIG. 2 is an enlarged, detailed, simplified view of the transmission of FIG. 1, in which the cone disks have part quasi-spherical friction surfaces, and the link elements have essentially part spherical engagement surfaces.

For purposes of explanation of the present invention, the transmission is also shown in FIG. 2, to an enlarged scale, on which four cone disks 24–27, with part-spherical surfaces, are shown, fixed to shafts 22, 23, respectively, to rotate therewith. The cone disks 24 and 26 are axially secured on their shafts, whereas cone disks 25, 27, coupled to the cylinder-piston units 28, 29, or integral therewith, are axially shiftable, as shown by arrows 30, 31, but also rotatable with the shafts 22, 23. The link chain 9 runs between the cone disks. In the neutral or base transmission setting of 1:1, the chain will be located along a base or center line 34. Rocker link elements 32, 33 have end faces which engage the facing surfaces of the cone disks 24, 25; 26, 27, respectively.

FIG. 2 also shows that the friction surfaces of the cone disks 24 to 27 have an essentially, in cross-section circular cone surface, so that the overall cone surface is essentially part-spherical. The end surfaces or facing surfaces of the rocker link elements 32, 33 also have an essentially part-circular or, rather, a part-spherical outer surface.

Figure 3:
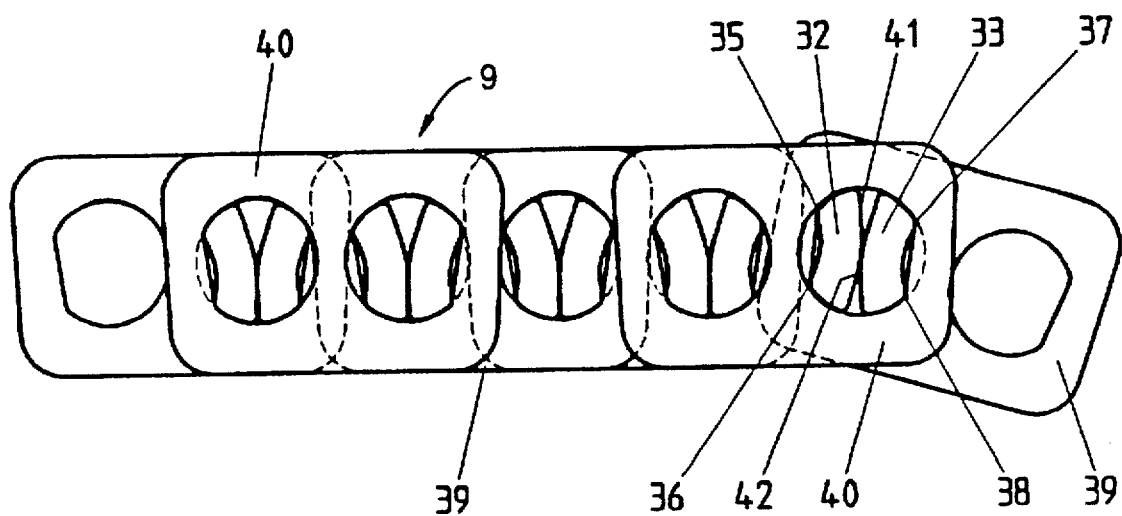
FIG. 3 is a side view of the link chain with pairs of rocker link elements.

FIG. 3 is a detailed side view of the chain 9, having pairs of rocker link elements 32, 33. The scale of FIG. 3 is enlarged with respect to the previously mentioned Figures. The rocker link elements 32, 33 are so shaped that they engage at two positions 35, 36; 37, 38 in openings formed in the plate links of the respectively associated links 39, 40. They are secured against rotation with respect to the associated plate links 39, 40.

The connecting rocker link elements 32, 33 are supported against each other for rocking movement over essentially convexly shaped rocking surfaces 41, 42. The rocking surfaces 41, 42 permit the rocker link elements 32, 33 to roll off against each other, when the chain links 39, 40 shift from their straight line, aligned position at the center of FIG. 3, into a respectively angular position shown at the right side of FIG. 3. The movement of the chain in which the links are aligned on the one hand and then angled with respect to each other, occurs each time when the chain runs in the gap between two facing cone disks of cone disk pairs 24, 25; 26, 27. Neighboring rocker link elements 32, 33, pivot to pivotable positions, and change as the spacing between the cone disk changes, that is, in dependence on the engagement radius of the cone disks with the respective rocker link elements.

Figure 4:
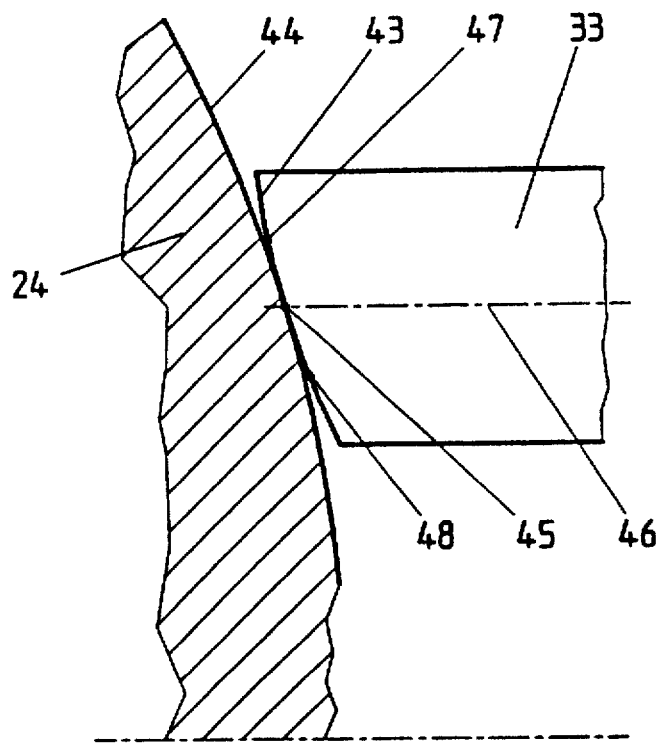
FIG. 4 is a highly enlarged frictional part-sectional view of engagement between the friction surface of a cone disk with the end surface of a rocker link element.

FIG. 4 is an enlarged fragmentary view of FIG. 2, which shows the pairing of one side of a rocker link element 33 with one cone disk 24. The rocker link element 33 has an essentially part-spherical, or part-circularly curved end surface 43, and the cone disk 24 likewise has a part-circular, in cross-section, bowed or curved friction surface 44. FIG. 4 clearly shows that the two elements of the system, rocker link and cone disk, engage at a contact position 45. The curvature of the engagement surface 43 of the rocker link element 33 is such that, in radial direction of the cone disk 24, adjacent parallel level lines are perpendicular to the longitudinal extent, or the axis 46 of the rocker element 33, respectively.

FIG. 4 also shows two further possible contact positions. The contact position 47 is associated with a smaller operating radius of the cone disk 24; the contact position 48 is associated with a larger radius of engagement.

FIG. 5 shows the subject matter of FIG. 4, if one considers the cone disk 24 of FIG. 4 to be transparent, looking from the left side through this transparent disk 24. FIG. 5 illustrates three pivoting positions of a rocker element 33, shown highly enlarged, and corresponding to three transmission positions of the transmission. For better illustration, the solidly shown rocker element contact 33b corresponds to a base or central transmission position of the transmission, for example a transmission of approximately 1:1. The chain-dotted position 33a is associated with a larger operating radius of the chain on the respective cone disk; the broken-line position at 33c is associated with a smaller operating radius on the cone disk.

The three pivoting positions of the rocker element 33 (collectively), in accordance with FIG. 5, are shown in FIG. 6, collectively, next to each other, to illustrate the pairing between the cone disk 24 and the respective rocker link elements 33. The illustration is an approximately radial top view, perpendicular to the lines 53, 54, 55 (FIG. 5). Lines 55, 53 and 54 illustrate, in radial direction, a larger, a central or average, and a smaller degree of curvature of the cone disk 24. Line 53 is a level line, or, rather, end face line through the contact position 45 (FIG. 4). The lines 54 and 55 are level positions through the respective contact points 47, 48 (FIG. 4). FIG. 6a, which corresponds to a larger operating radius, shows that the facing surface 43 of the rocker link element 33a is closer within the region of the outer edge, opposite to the rocking surface 41 (FIG. 3). The central, solidly shown position of rocker element 33b, FIG. 6b, shows that the engaging surface 43 (FIG. 4) of the rocker element 33, is already close to the rocking surface 41. FIG. 6c, which shows the position for a smaller operating radius of rocking element 33c, shows that the engagement surface 43 of the rocking element 33c is entirely at the edge common to the rocking surface 41 (FIG. 2). The same situation, of course, obtains with respect to rocking surface 42, which is shown in FIG. 6a–c. FIG. 6a–FIG. 6c are highly exaggerated; comparing, for example, FIG. 6a to FIG. 6c shows that the facing surface 43 of the rocking element 33 provides only a comparatively small surface portion for frictional transfer force. This small portion, of course, will be especially highly loaded.

In accordance with the present invention, the end surface 43 of the rocker element is so modified that the contact positions on the right and left edges of the rocker element 33 are shifted closer to the center thereof. The end surface line associated with the respective contact position, is essentially tangential to the associated running circumference at the cone disk 24, and as seen in FIG. 6b, is shifted about the angle δ.

Looked at in radial direction, the end surface shape is changed, as shown in FIG. 7. The perspective view of FIG. 7 illustrates that at the line 49, which corresponds to a 1:1 transmission, there is no shift or tilt of the contact line with respect to a theoretical line perpendicular to the longitudinal axis 46 of the respective rocker element 33. Starting from this central or base line 49, corresponding to the transmission ratio 1:1, the tilt or shift increases in the direction of the cone disk radially outwardly. For better illustration, the cone disk has been omitted from FIG. 7. This shift is such that, over the shifted region, the radially outwardly directed shift or inclination will be effective at smaller operating radii with respect to those in which the line 49 controls the transmission ratio. Conversely, and starting from line 49, a negative shift is used for radial inward operation of the element 33, which is used within the range suitable for large operating radii of the cone disk. With respect to the known face surface 50, shown schemetally in FIG. 7 for comparison, the course of the edge of the facing surface is illustrated by line 51, starting from a common edge 52. The resulting rocking surface ensures that the contact surfaces will always be in a median or a central portion between the outer edges of the rocker elements, considering the direction of operation of the chain. Thus, the contact surfaces will have sufficient support in the material of the rocker element and are protected.

Various changes and modifications may be made within the scope of the inventive concept.

We claim:

1. A link chain for a continuously variable, movable cone-type transmission having connecting plates (40), each plate being formed with an opening therein, and rocker link elements (32, 33) coupling said connecting plates into the chain, inserted in said openings and having essentially convexly shaped rocking surfaces (41, 42), in mutual engagement, and connecting successively placed connecting plates (40), said rocker link elements being formed with surface portions engageable with the rim of the openings of the connecting plates to prevent undesired relative rotation between said rocker link elements (32, 33) and the connecting plates (40), said rocker link elements having end facing surfaces (43) engageable with cone surfaces (44) of cones (3, 4, 7, 8, 24–27) of the cone-type transmission for transfer of frictional forces between said end facing surfaces (43) of the rocker link elements and the cone surfaces (44), wherein said end facing surfaces and said cone surfaces have curved, or partly spherical shape, facing each other, and wherein the end facing surface (43) of any rocker element (32, 33) defines a base or central surface line (49, 53), extending parallel to the direction of the chain when located in the transmission, said base or central surface line being located approximately at the radial position of engagement of the end facing surface (43) with the respective cone surface (44) of the transmission, when the transmission is set for a transmission ratio of 1:1, and wherein, in accordance with the invention, the surface lines (54) located radially outwardly from said central or base surface line (49, 53), and which describe the curved end facing surface (43), are inclined by an angle of inclination (δ) which increases from zero, starting at said central or base surface line (49, 53), about their intersection, with the rocking surfaces (41, 42) in the direction of the cone surface (44) of the associated cone (3, 4, 7, 8, 24–27) in engagement with said rocker element.

2. The chain of claim 1, wherein said angle of inclination (δ) changes from zero, starting at said base or central surface line to about two degrees, radially outwardly.

3. The chain of claim 1, wherein the surface lines located radially inwardly from said central or base surface line (49, 53), and which describes the curved end face (43), are inclined by an angle of inclination (δ) which increases from zero, starting at said central or base surface line (49, 53), about their intersection with the rocking surfaces (41, 43) in a direction of the cone surface (44) of the respective cone (3, 4, 7, 8, 24–27) in engagement with said rocker element.

4. A link chain herein a link chain for a continuously variable, movable cone-type transmission having connecting plates (40), each plate being formed with an opening therein, and rocker link elements (32, 33) coupling said connecting plates into the chain, inserted in said openings and having essentially convexly shaped rocking surfaces (41, 42), in mutual engagement, and connecting successively placed connecting plates (40), said rocker link elements being formed with surface portions engageable with the rim of the openings of the connecting plates to prevent undesired relative rotation between said rocker link elements (32, 33) and the connecting plates (40), said rocker link elements having end facing surfaces (43) engageable with cone surfaces (44) of cones (3, 4, 7, 8, 24–27) of the cone-type transmission for transfer of frictional forces between said end facing surfaces (43) of the rocker link elements and the cone surfaces (44), wherein said end facing surfaces and said cone surfaces have curved, or partly spherical shape, facing each other, and wherein the end facing surface (43) of any rocker element (32, 33) defines a base or central surface line (49, 53), extending parallel to the direction of the chain when located in the transmission, said base or control surface line being located approximately at the radial position of engagement of the end facing surface (43) with the respective cone surface (44) of the transmission, when the transmission is set for a transmission ratio of 1:1, and wherein, in accordance with the invention, the surface lines (54) located radially inwardly from said central or base surface line (49, 53), and which describe the curved end facing surface (43), are inclined by an angle of inclination (δ) which increases from zero, starting at said central or base surface line (49, 53) about their intersection, with the rocking surfaces (41, 42) in the direction of cone surface (44) of the associated cones (3, 4, 7, 8, 24–27) in engagement with said rocker element.

5. The chain of claim 3, wherein the surface lines (55) located radially inwardly from said central or base surface line (49, 53) extend at an angle which is opposite to, or the negative of, an angle in which said radially outwardly located surface lines (54) extend.

6. The chain of claim 5, wherein said radially or inwardly, and radially outwardly extending angles vary smoothly in a range from zero at said central or base surface line (49, 53) to a value of about 2° radially inwardly, or outwardly, respectively.

\* \* \* \* \*

UNITED STATES PATENT AND TRADEMARK OFFICE
CERTIFICATE OF CORRECTION

PATENT NO. : 5,792,013

DATED : August 11, 1998

INVENTOR(S) : Heinrich, et al.

It is certified that error appears in the above-identified patent and that said Letters Patent is hereby corrected as shown below:

Column 7, line 19 and 20, delete "which increases from zero".

Column 7, line 22, change "of" to --away from--.

Column 7, line 24, delete "herein a link chain".

Column 8, line 19, change "(54)" to --(55)--.

Column 8, line 25, delete "of" and insert --away from the--.

Column 8, line 26, change "cones" to --cone--.

Column 8, line 34, change "or inwardly," to --inwardly, or--.

UNITED STATES PATENT AND TRADEMARK OFFICE
CERTIFICATE OF CORRECTION

PATENT NO. : 5m792,013

DATED : August 11, 1998

INVENTOR(S) : Heinrich, et al

It is certified that error appears in the above-identified patent and that said Letters Patent is hereby corrected as shown below:

Column 8, line 35, delete "and".

Signed and Sealed this

Second Day of March, 1999

*Attest:*

Q. TODD DICKINSON

*Attesting Officer*     *Acting Commissioner of Patents and Trademarks*